(12) United States Patent
Kavanagh

(10) Patent No.: US 11,455,625 B2
(45) Date of Patent: Sep. 27, 2022

(54) METHOD OF ELECTRONIC PAYMENT BY MEANS OF A UNIFORM RESOURCE IDENTIFIER (URI)

(71) Applicant: Gregory Peter Kavanagh, Boulder, CO (US)

(72) Inventor: Gregory Peter Kavanagh, Boulder, CO (US)

(73) Assignee: Gregory Peter Kavanagh, Boulder, CO (US)

( * ) Notice: Subject to any disclaimer, the term of this patent is extended or adjusted under 35 U.S.C. 154(b) by 217 days.

(21) Appl. No.: 17/086,098

(22) Filed: Oct. 30, 2020

(65) Prior Publication Data

US 2021/0133736 A1    May 6, 2021

Related U.S. Application Data

(60) Provisional application No. 62/928,341, filed on Oct. 30, 2019.

(51) Int. Cl.
*G06Q 20/00* (2012.01)
*G06Q 20/38* (2012.01)
*G06Q 20/36* (2012.01)

(52) U.S. Cl.
CPC ..... *G06Q 20/3821* (2013.01); *G06Q 20/3674* (2013.01); *G06Q 20/3678* (2013.01); *G06Q 20/3825* (2013.01)

(58) Field of Classification Search
CPC .......... G06Q 20/3821; G06Q 20/3674; G06Q 20/3678; G06Q 20/3825
USPC .......................... 705/16, 21, 59; 380/44, 262
See application file for complete search history.

(56) References Cited

U.S. PATENT DOCUMENTS

2004/0111488 A1\* 6/2004 Allan ................ H04L 9/40
707/E17.119

\* cited by examiner

*Primary Examiner* — Dante Ravetti

(57) ABSTRACT

A method of generating electronic monetary tokens (tokens) on a server that supports transmission of the tokens between third parties by means of a Uniform Resource Identifier (URI) and also prevents double spending of the tokens. The tokens are represented by a substring of a Uniform Resource Identifier (URI), which identifies a resource in a network. As a payment request the substring comprises an indicator of price. As a payment for a resource the substring comprises a set of tokens and a buyer's unique identifier. On receipt of the tokens and before releasing the resource to the buyer the seller requests an indication from the server that the buyer owns the tokens thus preventing double spending of the tokens. Preferably, the URI is a Uniform Resource Locator (URL).

1 Claim, 12 Drawing Sheets

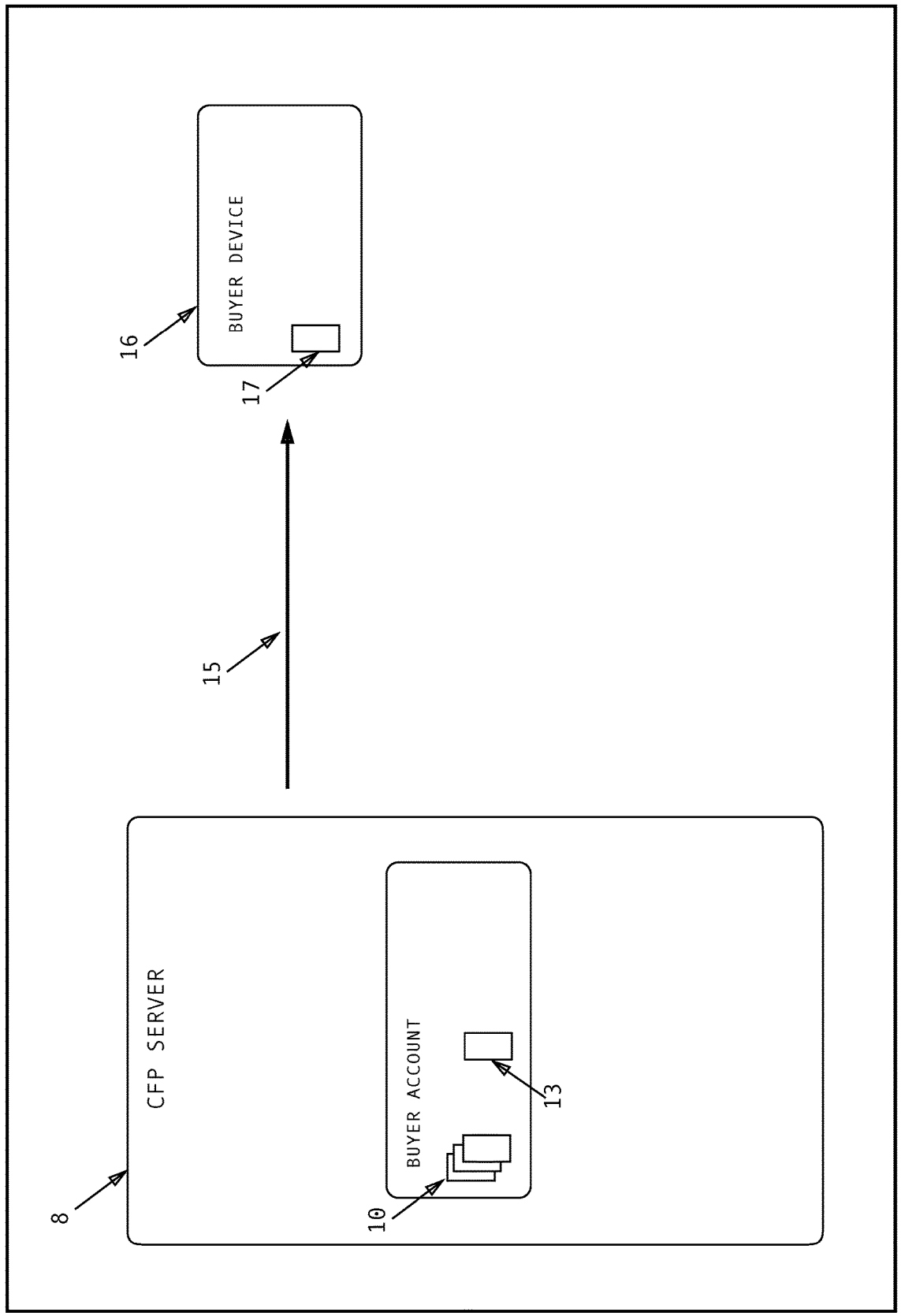

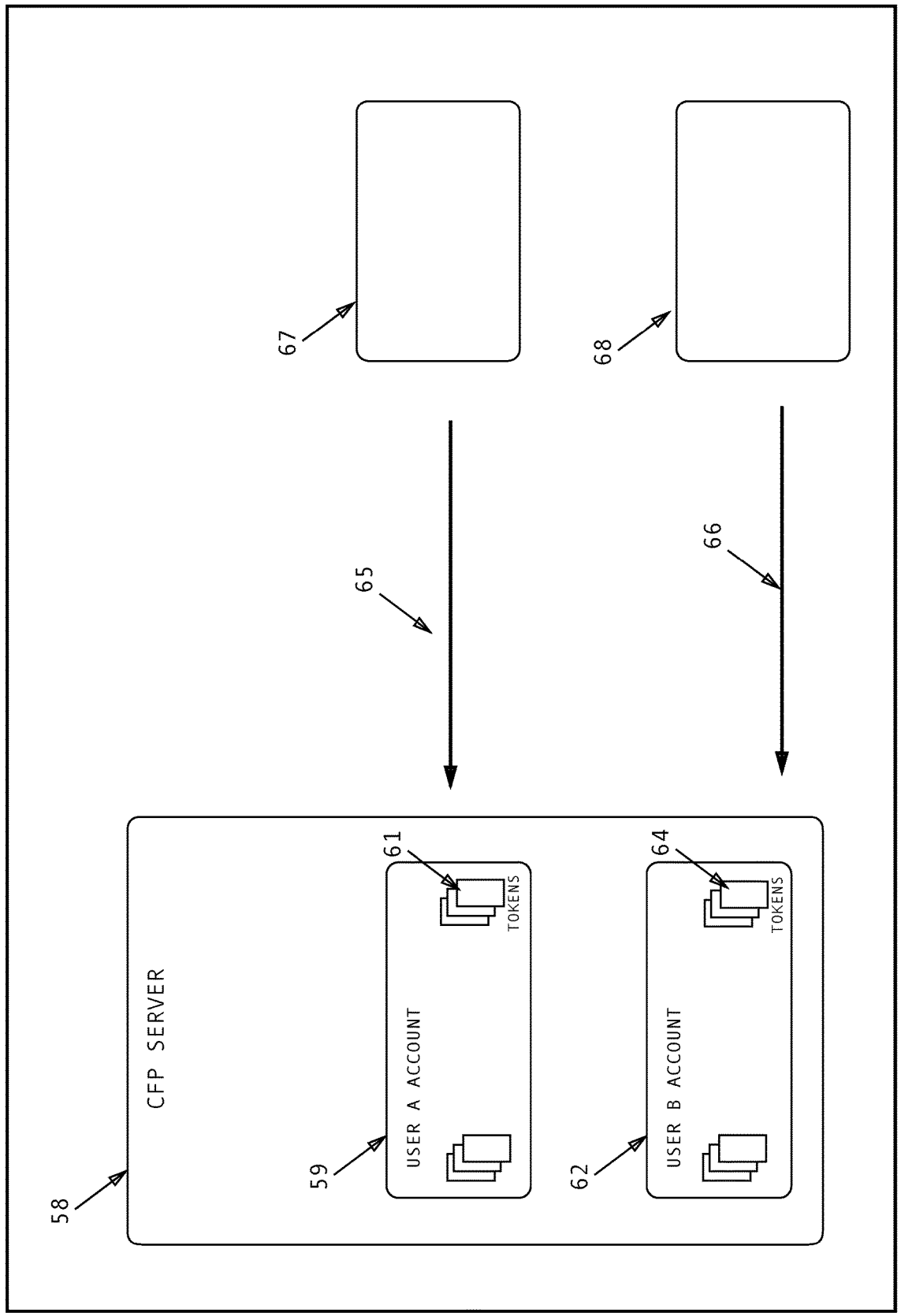

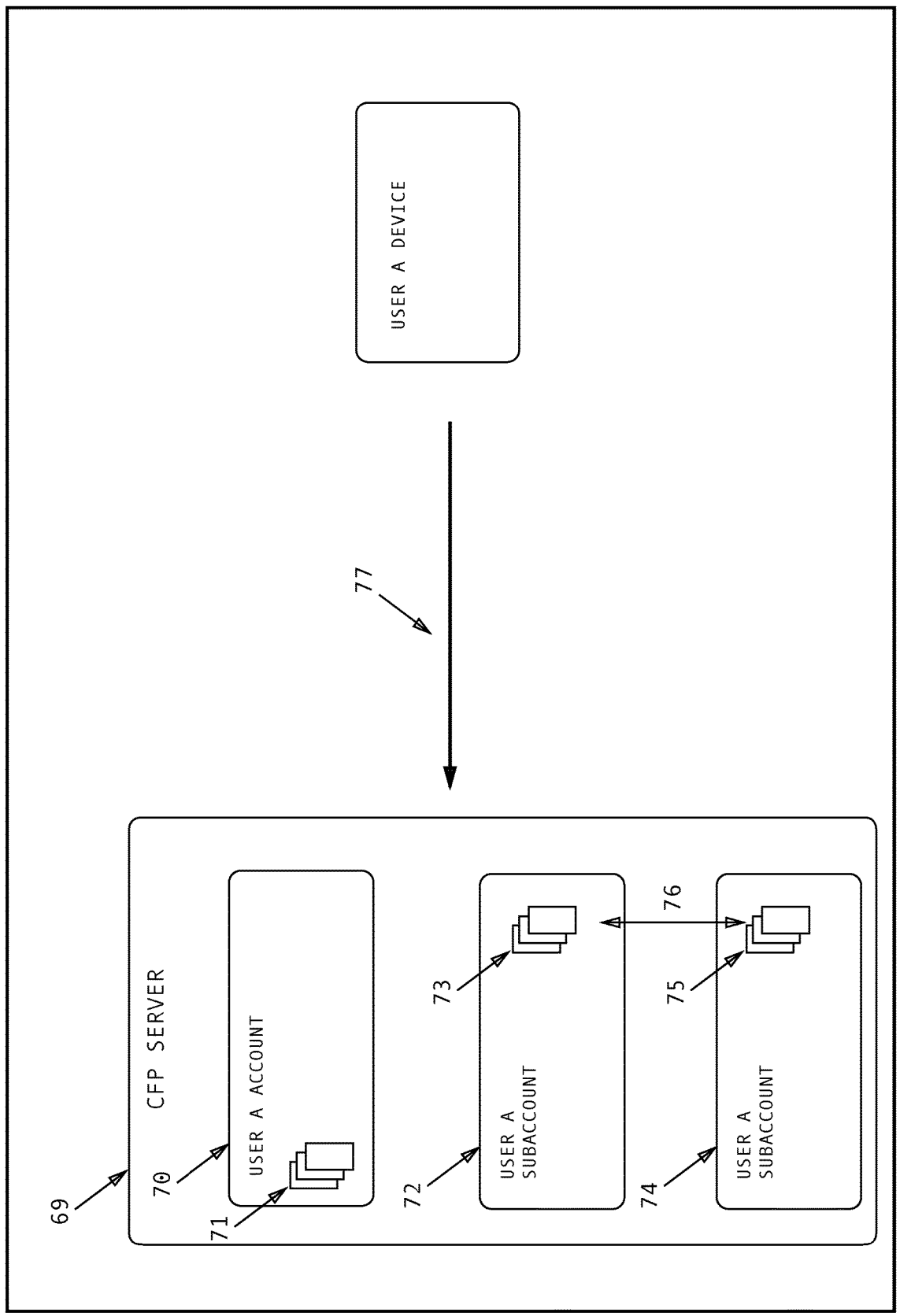

METHOD OF ELECTRONIC PAYMENT BY MEANS OF A UNIFORM RESOURCE IDENTIFIER (URI)

CROSS-REFERENCE TO RELATED APPLICATION

This application claims the benefit of U.S. Provisional Patent Application No. 62/928,341, filed Oct. 30, 2019, which is incorporated by reference herein in its entirety.

FIELD OF THE INVENTION

The present invention relates to a method of electronic payments.

BACKGROUND OF THE INVENTION

Consumption of media electronically has become widely popular. As most media can be converted to a digital format and consumed on a wide variety of common devices the consumer seeks ever more convenient ways to purchase media and creators seek ever more convenient ways to be compensated for their creations. Accordingly the present method provides consumers and producers with an efficient way to engage in transactions over a network of computers using a URI.

SUMMARY OF THE INVENTION

An object of the present method is to allow a request for payment to be included in a URI.

An object of the present method is to allow a payment to be included in a URI.

Another object of the present method is reduce the number of steps required for a buyer to purchase goods and services from a seller over a computer network.

Another object of the present method is to prevent double spending of electronic monetary tokens.

Yet another object of the present method Is to allow a user to purchase a multiplicity of electronic monetary tokens from a central financial provider and then use said tokens to make purchases from multiple sellers.

Yet another object of the present method is to provide a method of electronic payment that reduces the computational cost and data requirement per transaction.

A still further object of the present method is to provide limited anonymity to users of electronic monetary tokens.

A still further object of the present method is to allow a seller to redeem electronic monetary tokens exchanged for goods and services for money from a central financial provider.

These and other objects are satisfied by the method of the present method for generating electronic monetary tokens by a central financial provider using cryptographic algorithms. Using these tokens the buyer and seller may engage in transactions. By including tokens in a URI they may transmit tokens independently of the central financial provider. The seller can request a validation from the central financial provider that tokens have not been previously spent before completing transactions.

According to the present method, generation of the electronic monetary tokens begins in response to a request from an identified buyer to generate tokens to be used with identified sellers. First, the central financial provider's server generates a multiplicity of electronic monetary tokens using symmetric or asymmetric cryptography. By combining a timestamp, the buyer's unique identifier and a random number and then encrypting that combination the resulting hash can serve as a token. Other methods of creating the hash are also possible in other embodiments and all methods will require the input data for any cryptographic algorithms used to be unique. Second, the server associates the generated tokens with the buyer's unique identifier in a database entry. Said database entry can be considered an account. The account may have tokens added and subtracted to and from it. The user can be both a buyer and seller depending on the type of transaction they wish to engage in. Third, in response to a request from the buyer the server transmits a subset of tokens to the buyer, the buyer can request a single token or a multiplicity of tokens. Fourth, an identified seller can include a request for tokens in a URI in exchange for a resource. Fifth, the buyer can transmit the token or tokens to the seller by including their unique identifier and the token or tokens in the URI when requesting the resource. Sixth, the seller can transmit a request to the server for an indication as to the whether the buyer has said tokens in their account or not. Seven, if the buyer holds said tokens in their account the server transfers the tokens to the sellers account and transmits an indication to the seller that this transfer had completed successfully. Conversely if the tokens are not in the buyer's account the server transmits an indication to the seller of this fact.

The buyer can transmit tokens without first encrypting them thus there is little computational cost per transaction to the buyer. Additionally the data requirement per transaction is also small, because the electronic monetary token can be represented in as few as approximately 50-200 bytes. The computational cost to the seller per transaction is also small.

Other objects, features, and advantages of the present method will be apparent from the accompanying drawings and detailed description that follows.

BRIEF DESCRIPTION OF THE DRAWINGS

FIG. 2: Illustrates a user's client device requesting a token from the server.

FIG. 8: Illustrates a multiplicity of user's client devices requesting tokens be generated and added to the users database entries.

FIG. 9: Illustrates a user's client device requesting extra database entries under the user's controls to be created

DETAILED DESCRIPTION OF THE PREFERRED EMBODIMENTS

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed. In other instances, well known features have not been described in detail so as not to obscure the invention.

Briefly described, a financial services provider generates a number of electronic monetary tokens henceforth know as "tokens". The financial services provider then gathers the tokens into an electronic account and gives the account to a buyer. This is analogous to minting coins and putting them in a safe for the buyer. The financial services provider creates an empty account and gives it to a seller. The buyer can request delivery of one or more tokens. For each transaction the buyer presents an token to the seller. The seller can detect double-spending attempts by the buyer by requesting an indication from the financial services provider if the token resides in the buyers account. A successful transaction results in the token being transferred to the sellers account. In this embodiment the request for payment and the payment itself are facilitated by a URI that is altered to serve both purposes.

As used in this specification and any claims of this application, the terms "computer", "device", "server", "processor", and "memory" all refer to electronic or other technological devices. These terms exclude people or groups of people.

Figure 1:
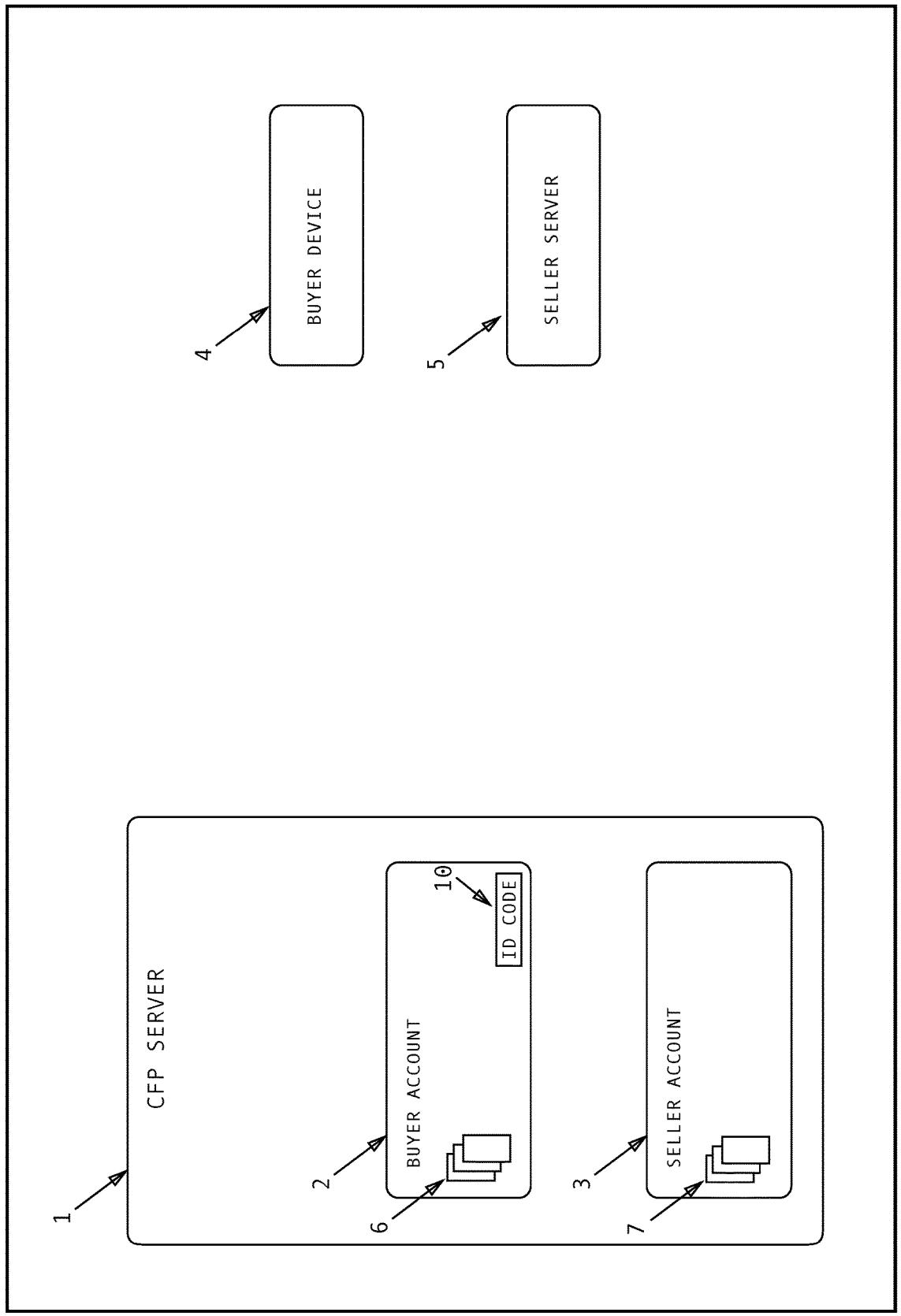
FIG. 1: Illustrates a server and two user's client devices.
Figure 1A:
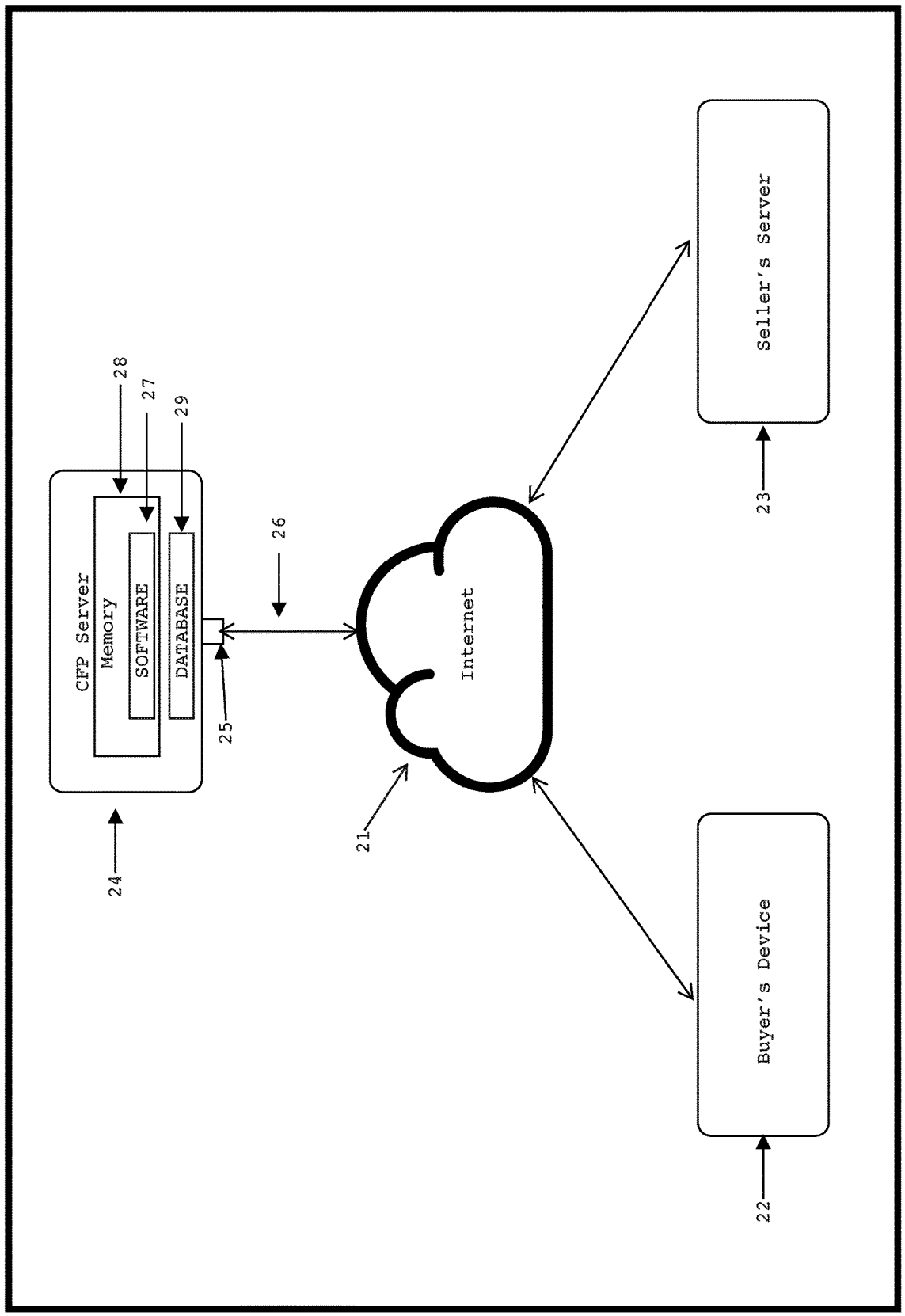
FIG. 1A: Illustrates a central financial provider's server, a buyer's device and a seller's server connected via an internet.

FIG. 1A is a diagram of a network of computer systems in which data may be processed and transmitted, according to one embodiment of the present method. As shown in FIG. 1A a number of computer systems, one or more of which may represent one implementation of a receiving system, are coupled together through an Internet 21. It will be appreciated that the term "Internet" refers to a network of networks. Such networks may use a variety of protocols for exchange of information, such as TCP/IP, ATM, SNA, SDI, RTP, RTSP etc. The physical connections of the Internet and the protocols and communication procedures of the Internet are well known to those in the art. Access to the Internet is typically provided by Internet service providers (ISPs), Users on client systems, such as the client computer systems 22, 23 generally obtain access to the Internet through Internet service providers, Access to the Internet may facilitate transfer of information (e.g., email, text files, media files, etc.) between two or more digital processing systems, such as the client computer systems 22, 23 and/or central financial provider server 24 which in this embodiment contains a database and software to facilitate; the creation of electronic monetary tokens; the distribution of said tokens; the ownership of said tokens by users; the movement of the tokens between user accounts in the database and other processing associated with the method. The software to facilitate these function does not necessarily need to reside on a single server and could be distributed to other servers that could process each task discreetly and communicate via a network the results of the tasks. Further embodiments where the functions of the server 24 is distributed over multiple computers are possible.

Computer, server and device may also include a communication interface 25. Communication interface 25 provides a two-way data communication coupling via a network link (not shown) to a local network (not shown). For example, if communication interface 25 is an integrated services digital network (ISDN) card or a modem, communication interface 25 provides a data communication connection to the corresponding type of telephone line, which comprises part of network link. If communication interface 25 is a local area network (LAN) card, communication interface 25 provides a data communication connection via network link 25 to a compatible LAN (not shown). Wireless links are also possible. In any such implementation, communication interface 25 sends and receives electrical, electromagnetic or optical signals which carry digital data streams representing various types of information.

Network link 26 typically provides data communication through one or more networks to other data devices. For example, network link 26 may provide a connection through a local network (not shown) to a local server computer (not shown) or to data equipment operated by an Internet Service Provider (ISP) (not shown). The ISP in turn provides data communication services through the world wide packet data communication network now commonly referred to as the "Internet" 21. Local network and Internet 21 both use electrical, electromagnetic or optical signals which carry digital data streams. The signals through the various networks and the signals on the network link and through communication interface 25, which carry the digital data to and from computer 24, are exemplary forms of carrier waves transporting the information. It should be apparent to a skilled practitioner that the computer is capable of sending and receiving data to another computer.

As used in this specification and any claims of this application, the term "device" is meant to include computers realized in various forms; a personal computer; a laptop device; a tablet device; a smartphone that may be using iOS, android or equivalent as an operating system; smartwatch that may be using iOS, android or equivalent as an operating system; gaming console; smart TV; smart speaker; internet of things devices including fridges, ovens or another smart appliance; operating systems cars or vehicles of any kind and advertising kiosks.

Computer 22, 23, 24 can send messages and receive data, including program code, through the network(s), network link 25, and communication interface 26. In the Internet example, remote server computer 24 might transmit a requested code for an application program through Internet 21, ISP, local network, and communication interface 25. The received code may be executed by processor as it is received, and/or stored in mass storage, or other non-volatile storage for later execution. In this manner, computer 24 may obtain application code in the form of a carrier wave. Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A server 24 is meant to include a computer with software 27 in memory 28 to carry out the data processing; transmission and receiving of data; writing and reading of data to a database 29 as described in these specifications.

As used herein, an "electronic monetary token" (token) is a group of electrically represented bits, which can be electronically transmitted and stored, that has some agreed upon monetary value that will be honored by a central financial services provider (CFP). Preferably, to support microtransactions the value represented by each electronic monetary token is small, such as, for example, 0.01¢, 1¢, 25¢, $1, or $2. (Note that the present invention is not limited to a particular monetary unit.)

As used herein, a central financial services provider (CFP) is any entity with which a buyer has an agreement with for the provision of tokens. Pursuant to their agreement, the CFP may charge the buyer's tokens against the buyer's checking account, savings account, credit card, or debit card. Buyer and CFP also agree to use a public-key cryptosystem to communicate with one another and exchange their public keys. This allows buyer to encrypt a message to bank with her private key, which CFP can later decrypt using the buyer's private key and vice versa. Sellers also set up accounts with CFP, agree to use a public-key cryptosystem and exchange public keys. Like sellers and buyers, each CFP uses at least one computing device 24. Software 27 for generating, tracking, and redeeming tokens are stored within the memory of the CFP's computing device or computer network. Instructions 27 may be written in any computer language, including, but not limited to C++, Python, or Javascript, for example. The charge for tokens may happen automatically and without the intervention of the buyer. If the charge cannot be completed the tokens may not be generated and the buyer can be alerted. Similarly if a buyer or seller wishes to redeem tokens they may make such a request to the CFP which may convert tokens to their monetary value and credit the payment source with said value. The buyer or seller may also request said value be credited to a different checking account, savings account, credit card, or debit card than the one used as the original payment source. Any tokens residing in the account of the buyer or seller may be redeemed, these tokens may have been accrued through the completion of transactions or may have been generated but remained unused.

The term "account" refers to an entry in a database 29. An account in this embodiment is a database entry consisting of a unique identifier for a user with the possibility of having electronic monetary tokens added or removed from said database entry. A user requesting the CFP to create an account on their behalf. The CFP may perform verification of a user's identity, financial standing and payment methods using the same methods it would for engaging in financial transactions securely with an unknown party. The account may be secured with various security implementations obvious to skilled practitioners to prevent nefarious actors utilizing funds and tokens illicitly. Any interaction further described in these specifications between a user and the CFP's server may utilize these security implementations such as, but not limited to, passwords, two factor authentication or biometrics.

Any person or entity purchasing goods or service via the communications system described in FIG. 1A using tokens is a buyer. Any person or entity providing goods or services for purchase or rent with tokens via the communications system described in FIG. 1A is a seller.

Figure 1B:
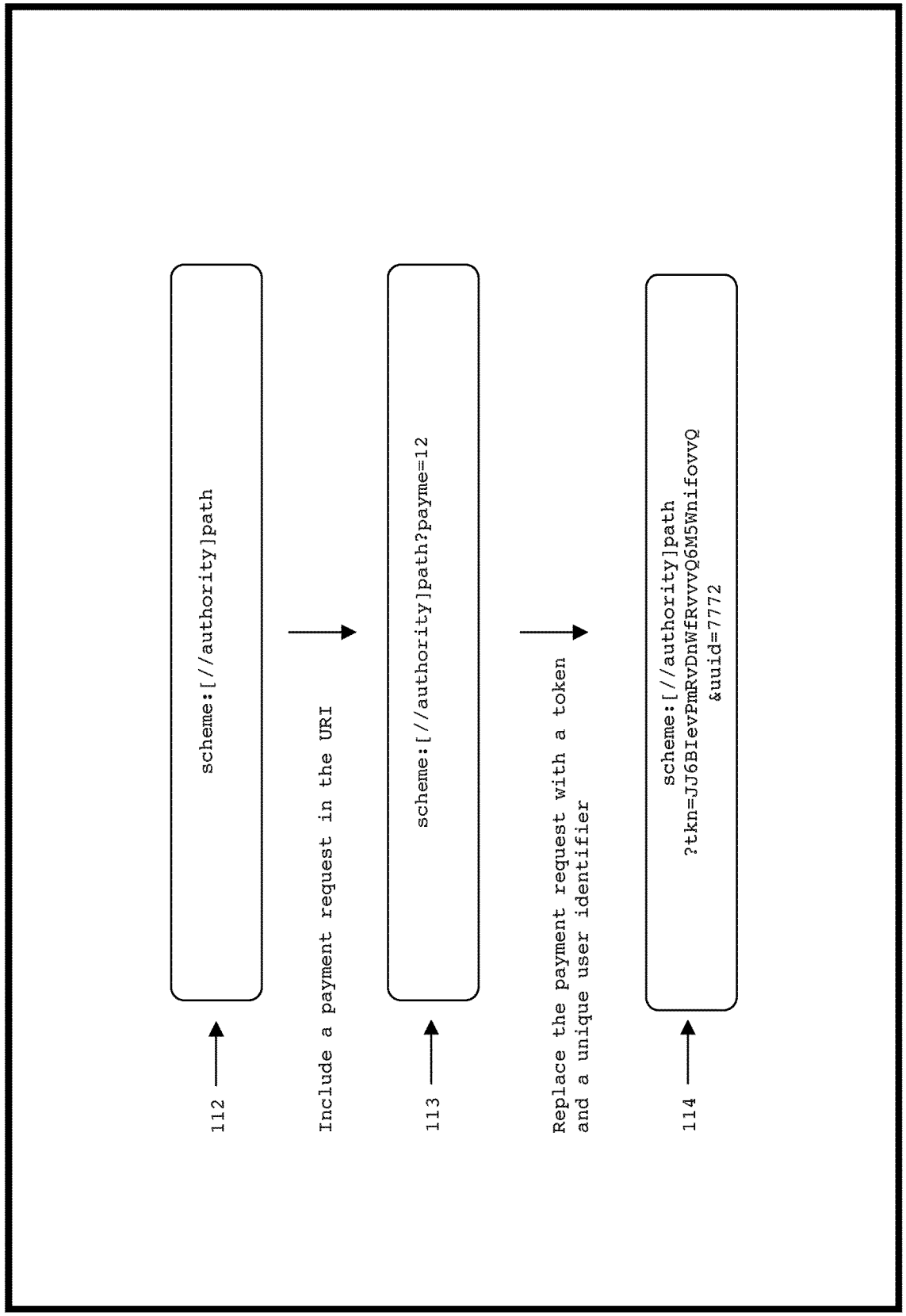
FIG. 1B: Illustrates a method for altering a URI to request payment and provide payment.
Figure 1C:
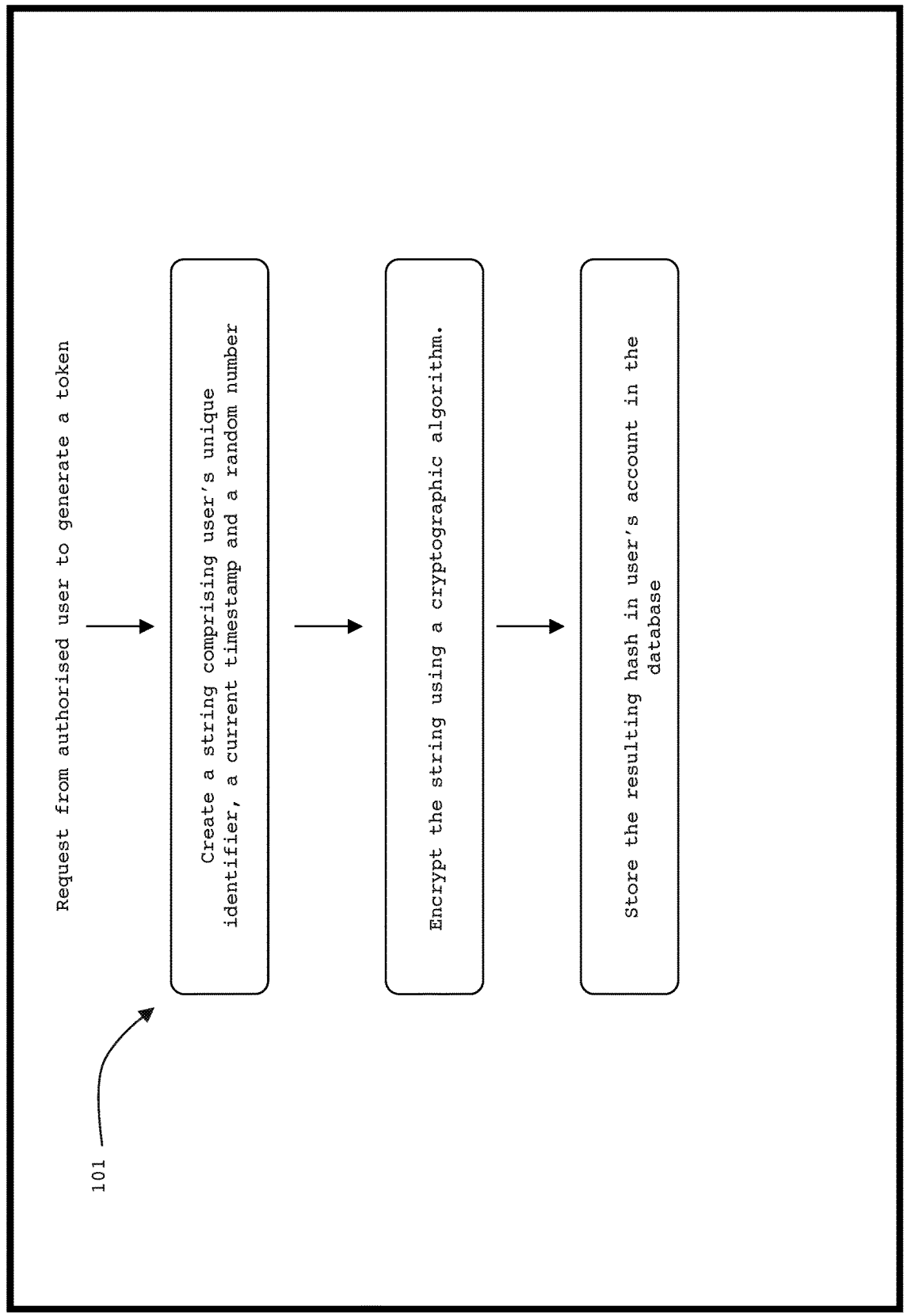
FIG. 1C: Illustrates a method to create an electronic monetary tokens.

FIG. 1B is a flow chart illustrating the alteration of a URI to facilitate payment requests and payments. The structure of the URI 112 will be understood by one skilled in the art to be of a standard format. The alteration of the URI in 113 allows for a seller to add a request for a payment to the standard URI. In this embodiment the use of the symbol "payme=" is used to indicate a number that represents the required number of tokens to complete a purchase. A skilled practitioner will recognize this as a common way to add information to the URI known as a query which can be parsed to extract a symbol and a value. The symbol can be any combination of characters but the symbol must be previously agreed upon by consensus between all parties involved in the transaction. The buyer, upon parsing the URI, may then further alter the URI 114 to request the resource. The buyer's device in this embodiment removes the "payme=" symbol and the number and replaces them with the symbol "tkn=" which indicates a string that represents and is a token. The method by which the buyer has requested the tokens will be illustrated later in this description. The buyer will append a token to the "tkn=" symbol and add it to the URI. The buyer will also add a unique identifier that is associated with the buyer on a central financial provider server. The symbol "uuid=" is used in this embodiment to indicate the unique identifier. Again the symbols can be any combination of characters but the symbol must be previously agreed upon by consensus between all parties involved in the transaction. The buyer then uses the altered URI to request a resource on the seller's server. When the seller's server receives the request it parses the URI and may request from the central financial provider's server information regarding the ownership of the token. In this embodiment the seller receives an indication that the token is owned by the user associated with the unique identifier. Conversely if the token is not in the account associated with the unique identifier then the central financial provider's server will indicate this to the seller.

Figure 3:
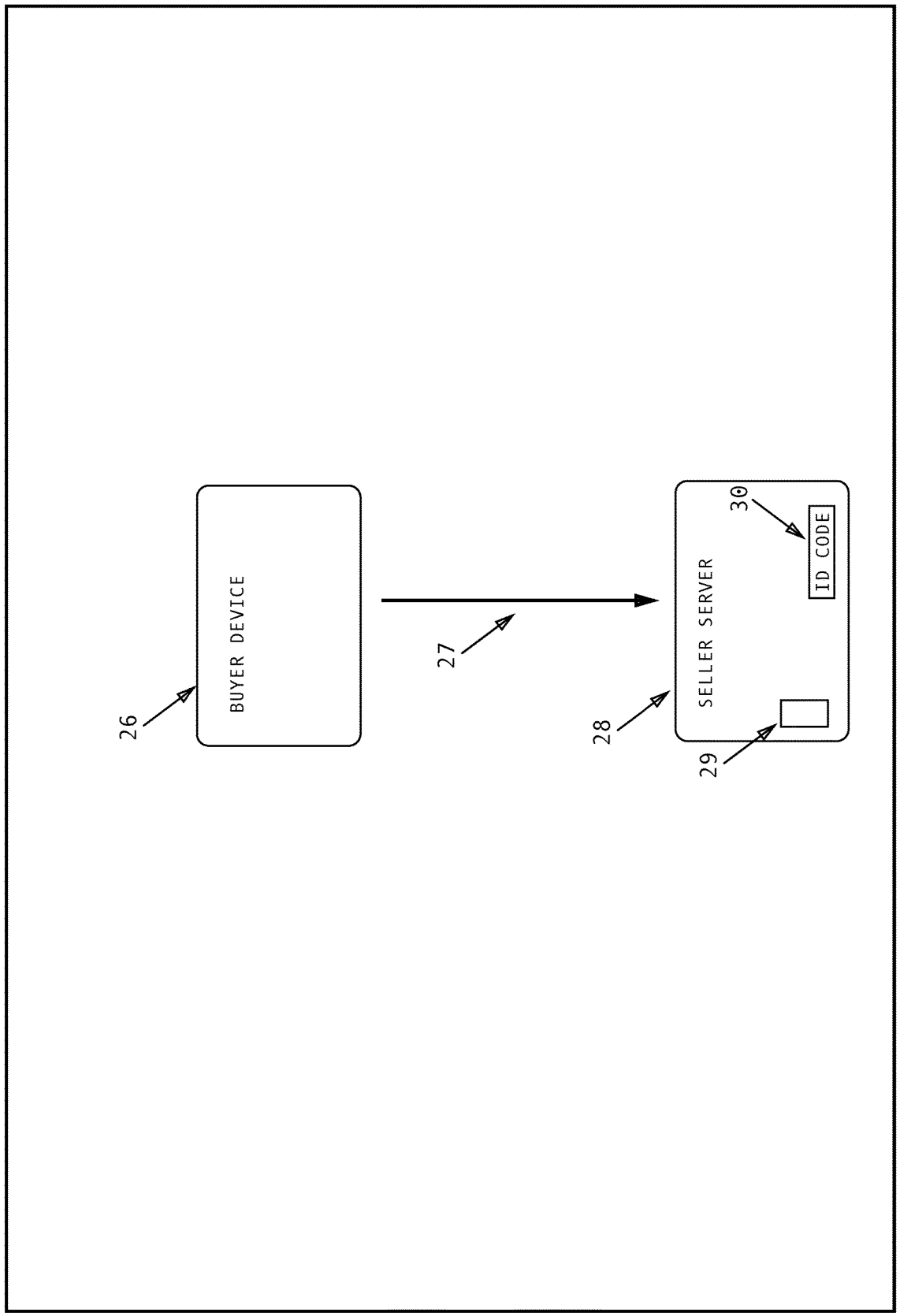
FIG. 3: Illustrates a token begin transferred from one user's client device to another user's client device.

FIG. 1 is a diagram of a central financial provider's (CFP) server 1, a buyer's device 4 and a seller's server 5. The CFS software 27 has previously created accounts 2,3 for each party in a database 29. For illustration purposes only the unique identifier (UID) 10 for the buyer is shown. It will be apparent to a skilled practitioner that each account will have a UID. Each account in this example contains a multiplicity of tokens 6,7. The diagram can be considered to be a subsection of the computer network system described in FIG. 1A Requesting Tokens FIG. 2 describes the buyer's device 16 requesting 15 a copy 17 of a token 13 from the CFP server 8 for use in a transaction. The request takes place over the communication system described in FIG. 1A. The requested token is delivered to the buyer's device 16 where it can be used to generate a URI for payment as described in FIG. 1B Purchase Process FIG. 3 describes a scenario where the seller has a resource that the buyer wishes to purchase or rent. The seller has made available a URI that identifies the resource and the buyer has knowledge of that URI. As described in FIG. 1B the seller has included a payment request in the URI which the buyer has knowledge of. Using the agreed upon URI schema 114 the buyer's device 26 sends 27 the token copy 29 and their UID 30 to the seller's server 28.

Validation Process

Figure 4:
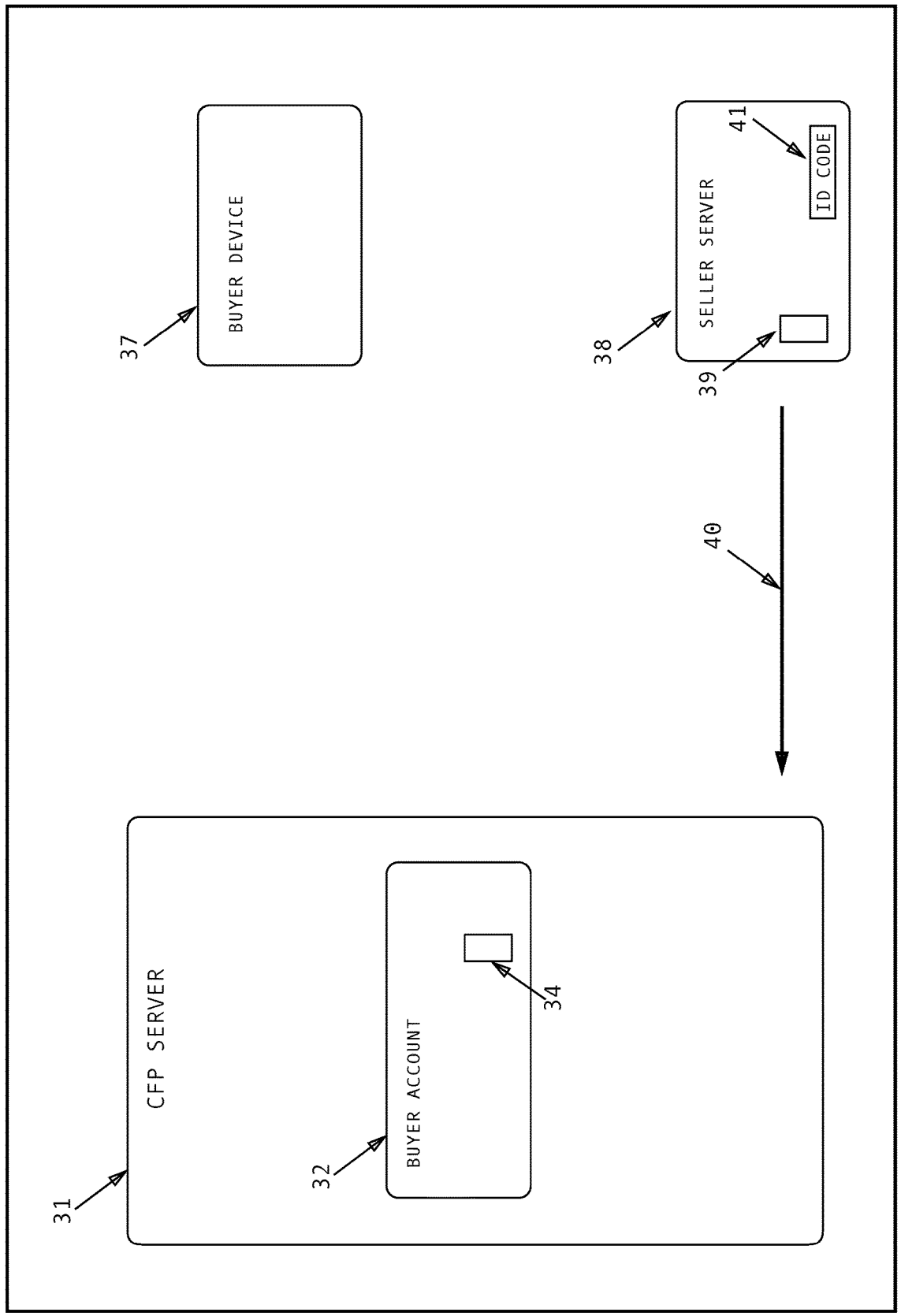
FIG. 4: Illustrates a user's client device requesting validation that a token belongs to another user.

FIG. 4 describes the method where the seller confirms the ownership of the token. Using the communication system set out in FIG. 1A the seller's server 38 sends a request 40 to the CFP server 31. The request includes the token copy 39 and the UID of the buyer 41. Upon receipt of the request 40 the CFP server finds the account 32 associated with the UID and searches said account for the original token 34. If the token is found the CFP server may return an indication that the buyer owns the token 34. Otherwise it may return an indication that the buyer does not own said token.

Figure 5:
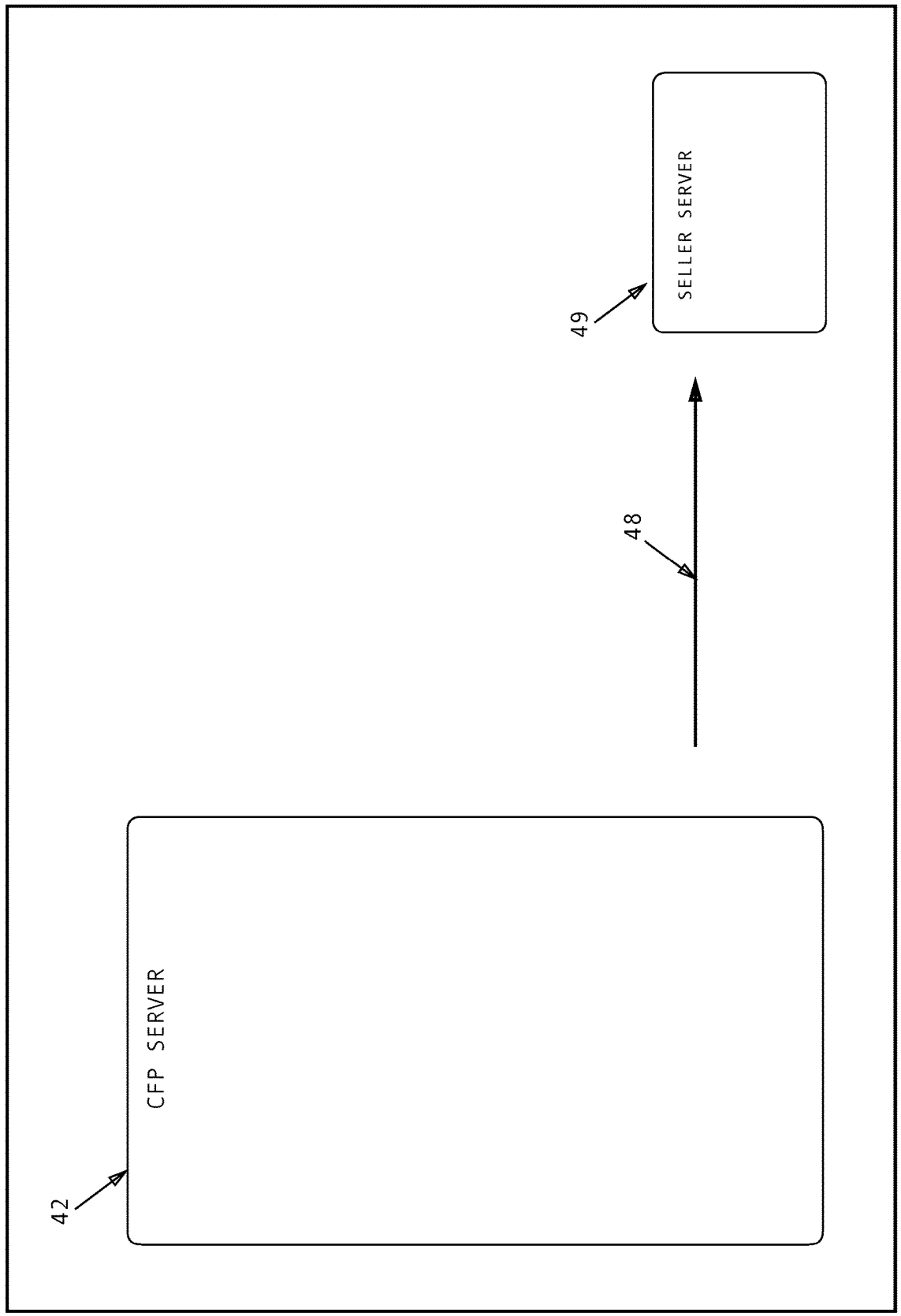
FIG. 5: Illustrates a validation response from the server to a client device

FIG. 5 describes the CFS server 42 sending an indication 48 to the seller's server 49 affirming or denying the token belongs to the buyer.

Value Transfer

Figure 6:
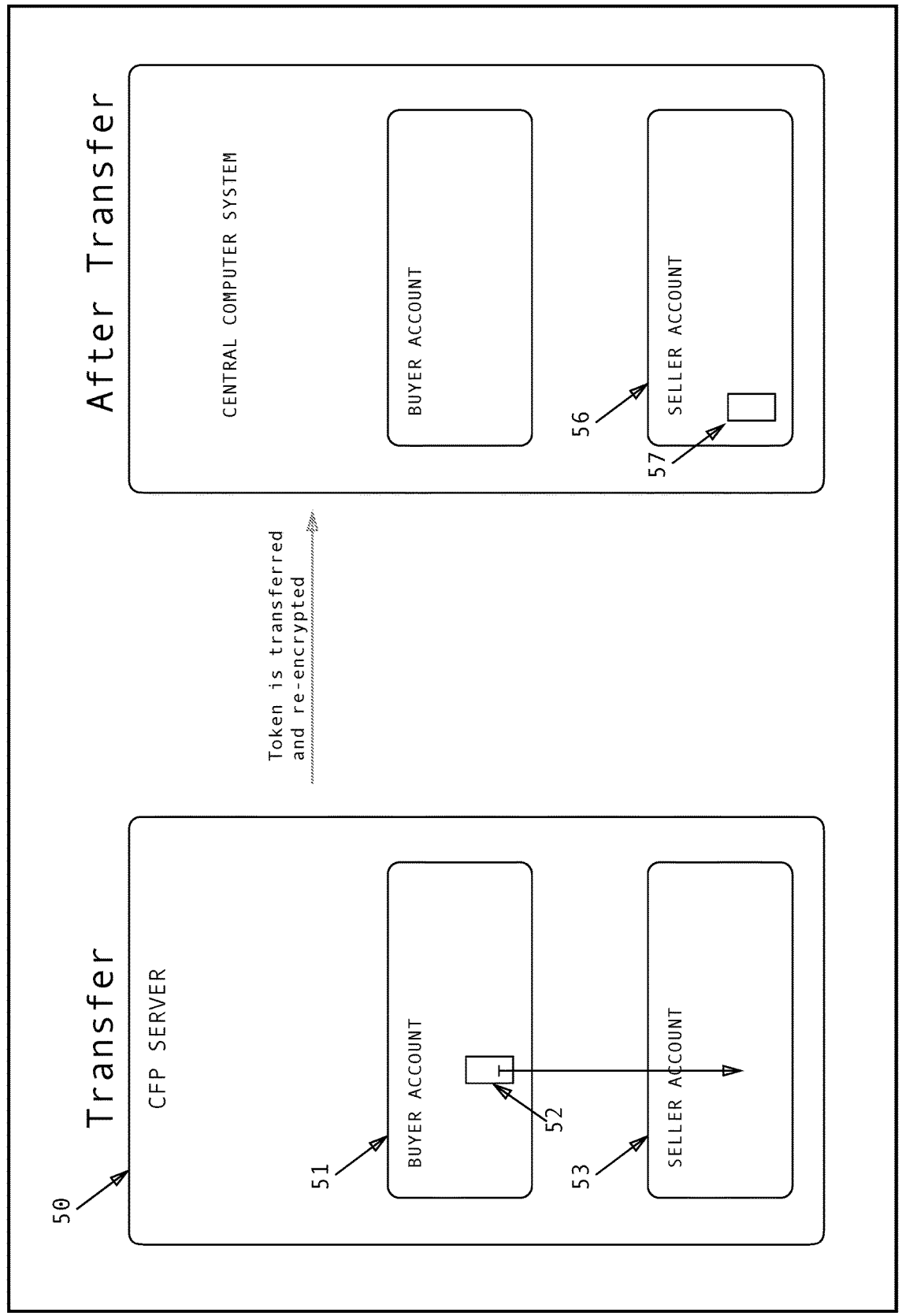
FIG. 6: Illustrates the transfer of a token from one database entry to another database entry on a server.

FIG. 6 Shows accounts during and after transfer of a token. Assuming the indication received by the seller server 49 in FIG. 5 affirms the ownership of the token 52 by the buyer. The CFS sever software 27 executes instructions to transfer the token 52 from the buyer's account 51 to the seller's account 53. The token may pass though a process of re-encryption as further described in FIG. 7 during the transfer. The token 57 is added to the seller's account 56.

Figure 7:
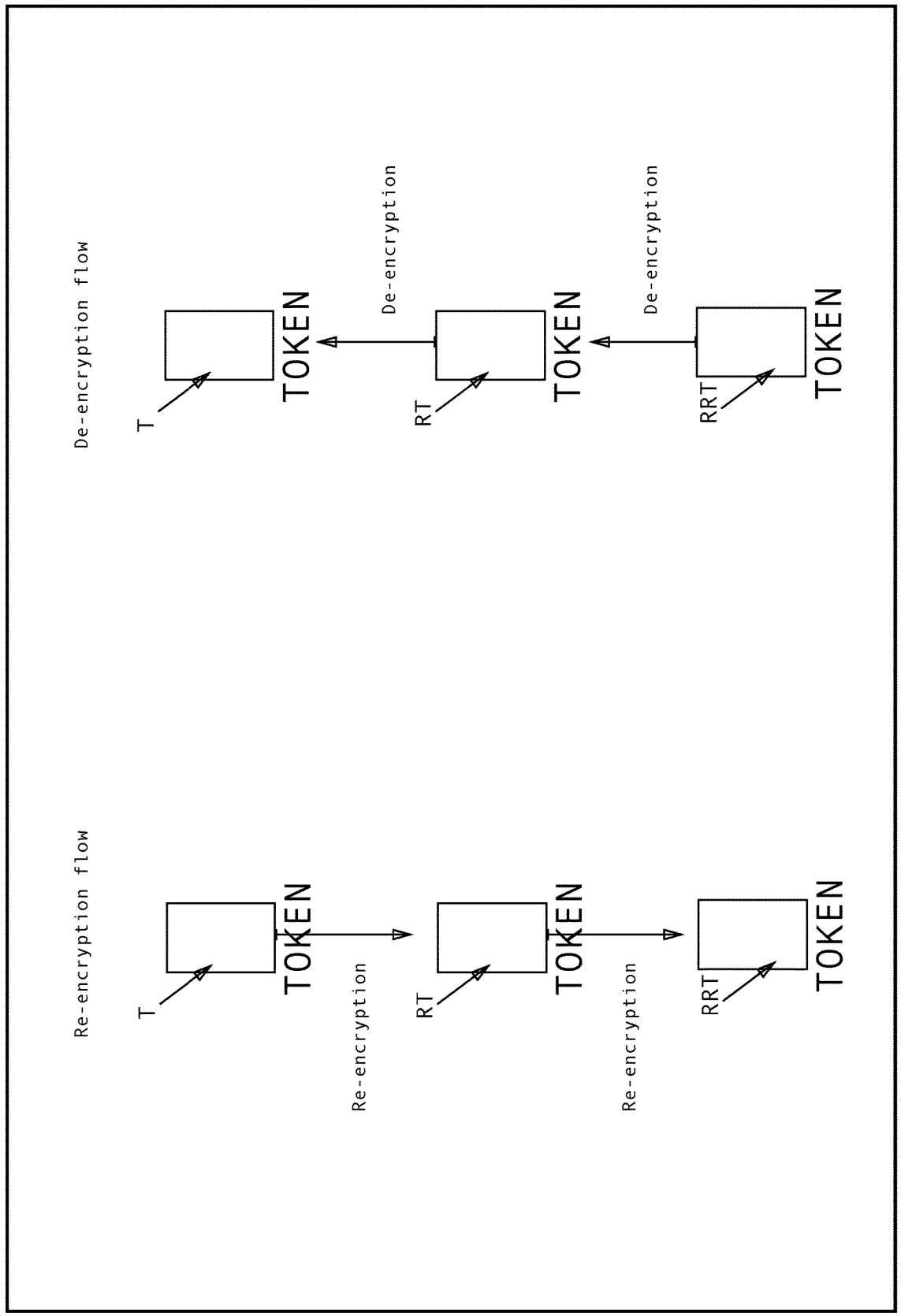
FIG. 7: Illustrates the re-encryption and decryption of a token.

FIG. 7 shows a flow chart that describes a process of re-encryption. The software 27 generates a token by combining the unique identifier for the user, a timestamp, a random number and possible other data then encrypting the combination having the resulting hash value serving as the token. When a token is being transferred from one account to another the software 27 creates a new hash by combining the unique identifier of the receiving account with a timestamp and possible other data and deriving a new hash using a cryptographic algorithm. The token can be decrypted using the same cryptographic algorithm to provide a history of the transfers completed.

Generating Tokens

FIG. 8 describes a method that users may use to request that tokens be generated and added to their accounts. Using the communication system described in FIG. 1A requests 65,66 are transmitted to the CFS server 58 by distinct user's devices 67,68. The requests specify a number of tokens 61,64 be created and added to the accounts 59,62 belonging to the users that transmitted the requests.

FIG. 9 describes a method that users may use to request 77 the creation of sub-accounts in the database that they control. Upon receiving the request the CFS server 69 executes instructions in the software 27 that create a database entry with a unique identifier that is associated with user A. This becomes a sub-account 72. User A can then request that tokens 71,73,75 it owns that reside in its account 70 or sub accounts 72,74 be transferred 76 between any of said accounts or sub-accounts.

CONCLUSION

In the foregoing specification, the method has been described with reference to specific exemplary embodiments thereof. It will, however, be evident that various modifications and changes may be made thereto without departing from the broader spirit and scope of the method as set forth in the appended claims. Accordingly, the specification and drawings are to be regarded in an illustrative rather than a restrictive sense.

What is claimed is:

1. A computerized method allowing payments between a buyer and a seller using electronic monetary tokens to be made based on a Uniform Resource Identifier (URI), which identifies a resource in a computer network, the method comprising steps of:
    including, by a seller server, a payment request in a URI;
    transmitting, by the seller server, the included payment request to a buyer's device;
    receiving, by the buyer device, the transmitted payment request from the seller server;
    parsing, by the buyer device, the received URI resulting in a string representing a request for payment;
    altering, by the buyer device, the URI by including a string comprising of the buyer's unique user identification string and one or a multiplicity of electronic monetary tokens;
    requesting, by the user device, using the altered URI a resource from the seller server;
    receiving, by the seller server, the request from the user device;
    parsing, by the seller server, the received request by parsing the altered URI resulting in a string representing the electronic monetary token or set of electronic monetary tokens and the unique user identification string; and
    requesting, by the seller server, an indication of ownership of the electronic monetary token or set of electronic monetary tokens by the user identified by the unique identification string from a trusted third party.

* * * * *